United States Patent [19]

Winter et al.

[11] Patent Number: 5,243,001
[45] Date of Patent: * Sep. 7, 1993

[54] PROCESS FOR THE PREPARATION OF A HIGH MOLECULAR WEIGHT OLEFIN POLYMER

[75] Inventors: Andreas Winter, Glashütten; Martin Antberg, Hofheim am Taunus; Walter Spaleck; Jürgen Rohrmann, both of Liederbach; Volker Dolle, Kelkheim, all of Fed. Rep. of Germany

[73] Assignee: Hoechst Aktiengesellschaft, Frankfurt, Fed. Rep. of Germany

[ * ] Notice: The portion of the term of this patent subsequent to Aug. 24, 2010 has been disclaimed.

[21] Appl. No.: 960,249

[22] Filed: Oct. 13, 1992

Related U.S. Application Data

[63] Continuation of Ser. No. 789,341, Nov. 8, 1991.

[30] Foreign Application Priority Data

Nov. 12, 1990 [DE] Fed. Rep. of Germany ....... 4035886

[51] Int. Cl.$^5$ ............................................. C08F 4/44
[52] U.S. Cl. .................................. 526/127; 526/160; 526/351; 502/152
[58] Field of Search .................... 526/127, 160

[56] References Cited

U.S. PATENT DOCUMENTS

| | | |
|---|---|---|
| 4,522,982 | 6/1985 | Ewen . |
| 4,769,510 | 9/1988 | Kaminsky et al. . |
| 4,871,705 | 10/1989 | Hoel ..................................... 526/160 |
| 5,081,322 | 1/1992 | Winter et al. ........................... 585/9 |

FOREIGN PATENT DOCUMENTS

| | | |
|---|---|---|
| 88-20435 | 2/1989 | Australia . |
| 89-31223 | 9/1989 | Australia . |
| 0336128 | 10/1989 | European Pat. Off. . |
| 0384264 | 8/1990 | European Pat. Off. . |
| 3726067 | 2/1989 | Fed. Rep. of Germany . |
| 3826075 | 2/1990 | Fed. Rep. of Germany . |

*Primary Examiner*—Joseph L. Schofer
*Assistant Examiner*—David Wu
*Attorney, Agent, or Firm*—Connolly and Hutz

[57] ABSTRACT

A very active catalyst system for olefin polymerization is composed of an aluminoxane and a metallocene of the formula I

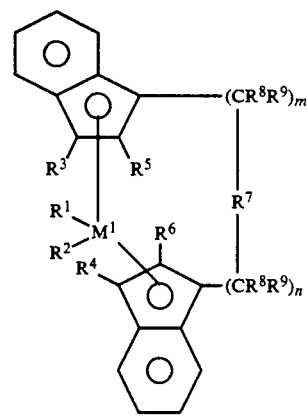

wherein preferably $M^1$ is Zr or Hf, $R^1$ and $R^2$ are alkyl or halogen, $R^3$ and $R^4$ are hydrogen, $R^5$ and $R^6$ are alkyl or haloalkyl, —$(CR^8R^9)_m$—$R^7$—$(CR^8R^9)_m$— is a single-membered or multimembered chain in which $R^7$ may also be a (substituted) hetero atom, and m+n is zero or 1. The catalyst system gives polymers having a high molecular weight and high stereospecificity.

13 Claims, No Drawings

PROCESS FOR THE PREPARATION OF A HIGH MOLECULAR WEIGHT OLEFIN POLYMER

This application is a continuation of application Ser. No. 07/789,341, filed Nov. 8, 1991.

The invention relates to a process for the preparation of olefin polymers having high isotacticity, a narrow molecular weight distribution and a high molecular weight.

Polyolefins having a high molecular weight are particularly important for the production of films, sheets or large hollow articles, such as, for example, pipes or moldings.

The literature discloses soluble metallocene compounds based on bis(cyclopentadienyl)zirconiumalkyl or halide in combination with oligomeric aluminoxanes. With these systems, ethylene and propylene can be polymerized with moderate activity, but isotactic polypropylene is not obtained.

It is also known that the catalyst system bis(cyclopentadienyl)titaniumdiphenyl/methylaluminoxane is capable of converting propylene into stereo block polymers, i.e. polypropylene having longer or shorter isotactic sequences (cf. U.S. Pat. No. 4,522,982). Substantial advantages of this catalyst system are the fact that the polymerization temperatures (0° C. to −60° C.) are irrelevant on a large industrial scale, and the completely unsatisfactory catalyst activities.

Isotactic polypropylene can be prepared with the aid of ethylenebis(4,5,6,7-tetrahydro-1-indenyl)zirconium dichloride together with an aluminoxane in a suspension polymerization (cf. EP-A 185 918). The polymer has a narrow molecular weight distribution, which is advantageous for certain applications, for example for high-performance injection molding.

At the same time, the catalyst system has a number of deficiences.

The polymerization is carried out in toluene, which has to be purified by an expensive procedure and freed from moisture and oxygen. Furthermore, the bulk density of the polymer is too low and the particle morphology and the particle size distribution are unsatisfactory. However, a particular disadvantage of the known process is that, at polymerization temperatures of interest industrially, it is possible to prepare only polymers having an unacceptably low molecular weight.

A special preactivation method for the metallocene with an aluminoxane was also proposed, which method leads to a considerable increase in the activity of the catalyst system and to a substantial improvement in the particle morphology of the polymer (cf. DE 37 26 067). Although the preactivation increases the molecular weight, no substantial increase can be achieved.

A further, but still insufficient increase in the molecular weight can be realized by using specially hetero atom-bridged metallocenes having high metallocene activity (EP-A 0 336 128).

Catalysts based on ethylenebisindenylhafnium dichloride and ethylenebis(4,5,6,7-tetrahydro-1-indenyl)hafnium dichloride and methylaluminoxane are also known, by means of which relatively high molecular weight polypropylenes can be prepared by suspension polymerization (cf. J. A. Ewen et al., J. Am. Chem. Soc. 109 (1987), 6544). Among industrially relevant polymerization conditions, however, the particle morphology of the polymers thus produced is unsatisfactory and the activity of the catalysts used is comparatively low.

In conjunction with the high catalyst costs, economical polymerization is thus impossible with these systems.

It was the object to find a catalyst which produces polymers having good particle morphology and a high molecular weight in a high yield.

It was found that this object can be achieved using bridged metallocene systems substituted in a certain manner in the ligand sphere.

The invention thus relates to a process for the preparation of olefin polymers by polymerization or copolymerization of an olefin of the formula $R^a$—CH=CH—$R^b$, wherein $R^a$ and $R^b$ are identical or different and are a hydrogen atom or a hydrocarbon radical having 1 to 14 C atoms, or $R^a$ and $R^b$, together with the atoms binding them, may form a ring, at a temperature of −60° to 200° C., at a pressure of 0.5 to 100 bar, in solution, in suspension or in the gas phase, in the presence of a catalyst which is composed of a metallocene as the transition metal compound and an aluminoxane of the formula (II)

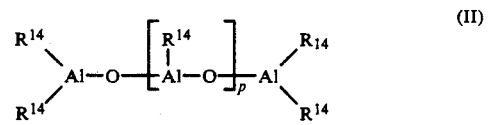

for the linear type and/or of the formula III

for the cyclic type,
wherein, in the formulae (II) and (III), the radicals $R^{14}$ may be identical or different and are a $C_1$–$C_6$-alkyl group, a $C_6$–$C_{18}$-aryl group or hydrogen, and p is an integer of from 2 to 50, wherein the metallocene is a compound of the formula I

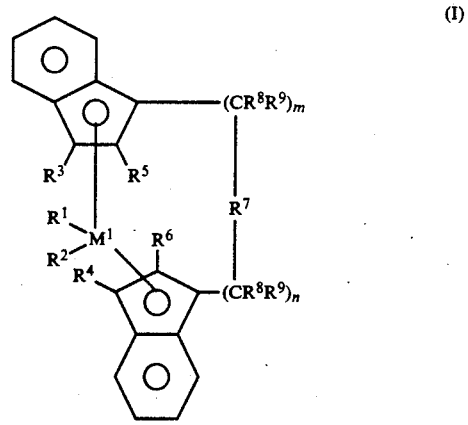

wherein
- $M^1$ is a metal of group IVb, Vb or VIb of the Periodic Table,
- $R^1$ and $R^2$ are identical or different and are a hydrogen atom, a $C_1$–$C_{10}$alkyl group, a $C_1$–$C_{10}$-alkoxy group, a $C_8$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$ and $R^4$ are identical or different and are a hydrogen atom, a halogen atom, a $C_1$-$C_{10}$-alkyl group which may be halogenated, a $C_6$-$C_{10}$-aryl group, an —$NR_2^{10}$, —$SR^{10}$, —$OSiR_3^{10}$, —$SiR_3^{10}$ or —$PR_2^{10}$ radical, wherein $R^{10}$ is a halogen atom, a $C_1$-$C_{10}$-alkyl group or a $C_6$-$C_{10}$-aryl group, $R^5$ and $R^6$ are identical or different and have the meaning stated for $R^3$ and $R^4$, with the proviso that $R^5$ and $R^6$ are not hydrogen, $R^7$ is

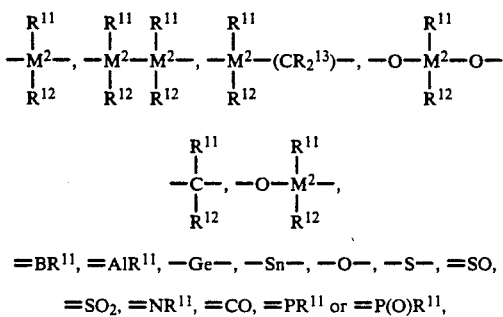

$=BR^{11}$, $=AlR^{11}$, —Ge—, —Sn—, —O—, —S—, =SO, $=SO_2$, $=NR^{11}$, =CO, $=PR^{11}$ or $=P(O)R^{11}$, wherein $R^{11}$, $R^{12}$ and $R^{13}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ or $R^{11}$ and $R^{13}$, together with the atoms binding them, each form a ring, $M^2$ is silicon, germanium or tin, $R^8$ and $R^9$ are identical or different and have the meaning stated for $R^{11}$ and m and n are identical or different and are zero, 1 or 2, m plus n being zero, 1 or 2.

Alkyl is straight-chain or branched alkyl. Halogen (halogenated) is fluorine, chlorine, bromine or iodine, preferably fluorine or chlorine.

The present invention furthermore relates to the polyolefins prepared by the process described.

The catalyst to be used for the process according to the invention is composed of an aluminoxane and a metallocene of the formula I

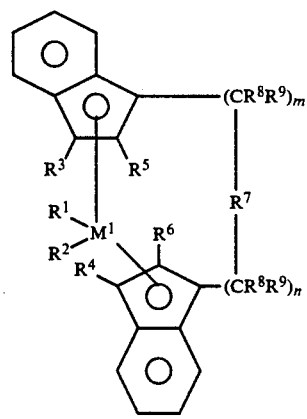

(I)

In the formula I, $M^1$ is a metal of group IVb, Vb or VIb of the Periodic Table, for example titanium, zirconium, hafnium, vanadium, niobium, tantalum, chromium, molybdenum or tungsten, preferably zirconium, hafnium or titanium.

$R^1$ and $R^2$ are identical or different and are a hydrogen atom, a $C_1$-$C_{10}$-alkyl group, preferably a $C_1$-$C_3$-alkyl group, a $C_1$-$C_{10}$-alkoxy group, preferably a $C_1$-$C_3$-alkoxy group, a $C_6$-$C_{10}$-aryl group, preferably a $C_6$-$C_8$-aryl group, a $C_6$-$C_{10}$-aryloxy group, preferably a $C_6$-$C_8$-aryloxy group, a $C_2$-$C_{10}$-alkenyl group, preferably a $C_2$-$C_4$-alkenyl group, a $C_7$-$C_{40}$-arylalkyl group, preferably a $C_7$-$C_{10}$-arylalkyl group, a $C_7$-$C_{40}$-alkylaryl group, preferably a $C_7$-$C_{12}$-alkylaryl group, a $C_8$-$C_{40}$-arylalkenyl group, preferably a $C_8$-$C_{12}$-arylalkenyl group, or a halogen atom, preferably chlorine.

$R^3$ and $R^4$ are identical or different and are a hydrogen atom, a halogen atom, preferably a fluorine, chlorine or bromine atom, a $C_1$-$C_{10}$-alkyl group, preferably a $C_1$-$C_4$-alkyl group, which may be halogenated, a $C_6$-$C_{10}$-aryl group, preferably a $C_6$-$C_8$-aryl group, an —$NR_2^{10}$, —$SR^{10}$, —$OSiR_3^{10}$, —$SiR_3^{10}$ or —$PR_2^{10}$ radical, wherein $R^{10}$ is a halogen atom, preferably a chlorine atom, or a $C_1$-$C_{10}$-alkyl group, preferably a $C_1$-$C_3$-alkyl group, or a $C_6$-$C_{10}$-aryl group, preferably a $C_6$-$C_8$-aryl group. $R^3$ and $R^4$ are particularly preferably hydrogen.

$R^5$ and $R^6$ are identical or different, preferably identical, and have the meanings described for $R^3$ and $R^4$, with the proviso that $R^5$ and $R^6$ may not be hydrogen. $R^5$ and $R^6$ are preferably ($C_1$-$C_4$)-alkyl which may be halogenated, such as methyl, ethyl, propyl, isopropyl, butyl, isobutyl or trifluoromethyl, in particular methyl.

$R^7$ is

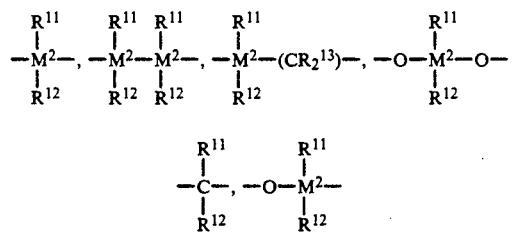

$=BR^{11}$, $AlR^{11}$, —Ge—, —Sn—, —O—, —S—, =SO, $=SO_2$, $=NR^{11}$, =CO, $=PR^{11}$ or $=P(O)R^{11}$, wherein $R^{11}$, $R^{12}$ and $R^{13}$ are identical or different and are a hydrogen atom, a halogen atom, a $C_1$-$C_{10}$-alkyl group, preferably a $C_1$-$C_{14}$-alkyl group, in particular a methyl group, a $C_1$-$C_{10}$-fluoroalkyl group, preferably a $CF_3$ group, a $C_6$-$C_{10}$-aryl group, preferably a $C_6$-$C_8$-aryl group, a $C_8$-$C_{10}$-fluoroaryl group, preferably a pentafluorophenyl group, a $C_1$-$C_{10}$-alkoxy group, preferably a $C_1$-$C_4$-alkoxy group, in particular a methoxy group, a $C_2$-$C_{10}$-akenyl group, preferably a $C_2$-$C_4$-alkenyl group, a $C_7$-$C_{40}$-arylalkyl group, preferably a $C_7$-$C_{10}$-arylalkyl group, a $C_8$-$C_{40}$-arylalkenyl group, preferably a $C_8$-$C_{12}$-arylalkenyl group, or a $C_7$-$C_{40}$-alkylaryl group, preferably a $C_7$-$C_{12}$-alkylaryl group, or $R^{11}$ and $R^{12}$ or $R^{11}$, and $R^{13}$, together with the atoms binding them, each form a ring.

$M^2$ is silicon, germanium or tin, preferably silicon or germanium.

$R^7$ is preferably $=CR^{11}R^{12}$, $=SiR^{11}R^{12}$, $=GeR^{11}R^{12}$, —O—, —S—, =SO, $=PR^{11}$ or $=P(O)R^{11}$.

$R^8$ and $R^9$ are identical or different and have the meaning stated for $R^{11}$.

m and n are identical or different and are zero, 1 or 2, preferably zero of 1, m plus n being zero, 1 or 2, preferably zero or 1.

The particularly preferred metallocenes are thus the compounds of the formulae A, B an C (A) 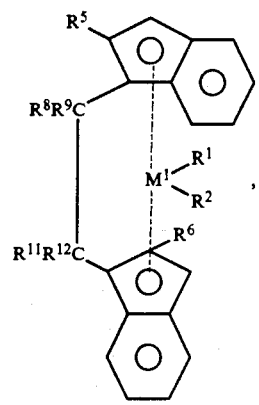

(B) 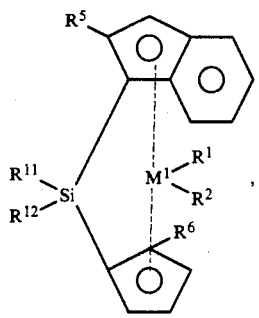

(C) 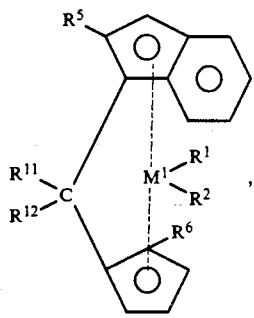

in which $M^1$ is Zr or Hf, $R^1$ and $R^2$ are methyl or chlorine, $R^5$ and $R^6$ are methyl, ethyl or trifluoromethyl and $R^8$, $R^9$, $R^{11}$ and $R^{12}$ have the above mentioned meanings, in particular the compounds I mentioned in the Illustrative Examples.

The chiral metallocenes are used as a racemate for the preparation of highly isotactic poly-1-olefins. However, it is also possible to use the pure R or S form. Optically active polymers can be prepared with these pure stereoisomeric forms. However, the meso form of the metallocenes should be separated off, since the center which is active in polymerization (the metal atom) is no longer chiral in these compounds owing to mirror symmetry at the central metal and therefore cannot produce the highly isotactic polymer. If the meso form is not separated off, an atactic polymer is formed in addition to isotactic polymers. For certain applications—for example flexible moldings—this may be quite desirable.

The separation of stereoisomers is known in principle.

The metallocenes described above can be prepared according to the following reaction scheme:

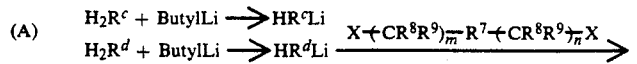
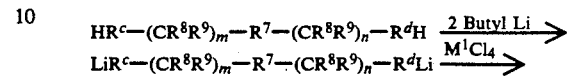
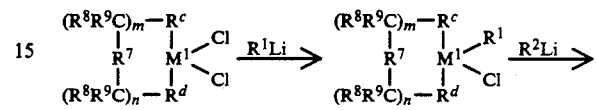

X = Cl, Br, I, O-Tosyl;

$H_2R^c =$ 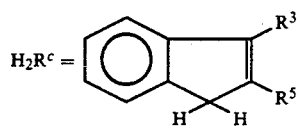

$H_2R^d =$ 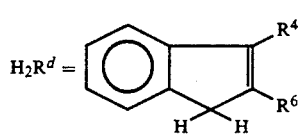

The preparation processes are known from the literature; cf. Journal of Organometallic Chem. 288 (1985) 63–67, EP-A 320 762 and the Illustrative Examples.

According to the invention, the cocatalyst used is an aluminoxane of the formula (II)

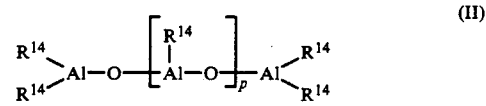 (II)

for the linear type and/or of the formula (III)

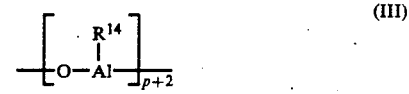 (III)

for the cyclic type, wherein, in the formulae (II) and (III), the radicals $R^{14}$ may be identical or different and are a $C_1$–$C_6$-alkyl group, a $C_6$–$C_{18}$-aryl group or hydrogen, and p is an integer of from 2 to 50, preferably form 10 to 35.

The radicals $R^{14}$ are preferably identical and are methyl, isobutyl, phenyl or benzyl, particularly preferably methyl.

If the radicals $R^{14}$ are different, they are preferably methyl and hydrogen or alternatively methyl and isobutyl, hydrogen or isobutyl preferably being present in an amount of 0.01–40% (number of radicals $R^{14}$).

The aluminoxane can be prepared in various ways by known processes. One of the methods comprises, for example, reacting an aluminum-hydrocarbon compound and/or a hydridoaluminum-hydrocarbon compound with water (gaseous, solid, liquid or bound - for example as water of crystallization) in an inert solvent (such as, for example, toluene). For the preparation of an aluminoxane having different alkyl groups $R^{14}$, two different aluminumtrialkyls ($AlR_3 + AlR'_3$) are reacted with water, depending on the desired composition (cf. S. Pasynkiewicz, Polyhedron 9 (1990) 429 and EP-A 302 424).

The exact structure of the aluminoxanes II and III is not known.

Regardless of the method of preparation, the common feature of all aluminoxane solutions is a changing content of unconverted aluminum starting compound, which is present in free form or as an adduct.

It is possible to preactivate the metallocene before use in the polymerization reaction with an aluminoxane of the formula (II) and/or (III). This substantially increases the polymerization activity and improves the particle morphology.

The preactivation of the transition metal compound is carried out in solution. The metallocene is preferably dissolved in a solution of the aluminoxane in an inert hydrocarbon. A suitable inert hydrocarbon is an aliphatic or aromatic hydrocarbon. Toluene is preferably used.

The concentration of the aluminoxane in the solution is in the range from about 1% by weight to the saturation limit, preferably from 5 to 30% by weight, based in each case on the total solution. The metallocene may be used in the same concentration, but is preferably employed in an amount of $10^{-4} - 1$ mol per mol of aluminoxane. The preactivation time is 5 minutes to 60 hours, preferably from 5 to 60 minutes. It is carried out at a temperature of $-78°$ C. to $100°$ C., preferably $0°$ to $70°$ C.

The metallocene can also be prepolymerized or applied to a carrier. For prepolymerization, the olefin used in the polymerization, or one of the olefins used in the polymerization, is preferably used.

Suitable carriers are, for example, silica gels, aluminas, solid aluminoxane or other inorganic carriers. Another suitable carrier is a polyolefin powder in finely divided form.

A further possible embodiment of the process according to the invention comprises using a salt-like compound of the formula $R_xNH_{4-x}BR'_4$ or of the formula $R_3PHBR'_4$ as a cocatalyst, instead of or in addition to an aluminoxane. In the formulae, x is 1, 2 or 3, the radicals R are identical or different and are alkyl or aryl and R' is aryl which may also be fluorinated or partially fluorinated. In this case, the catalyst is composed of the reaction product of a metallocene with one of the stated compounds (cf. EP-A 277 004 and the Preparation Examples C and F).

To remove catalyst poisons present in the olefin, purification with an aluminumalkyl, for example $AlMe_3$ or $AlEt_3$, is advantageous. This purification may be carried out in the polymerization system itself, or the olefin is brought into contact with the Al compound prior to addition to the polymerization system and is then separated off again.

The polymerization or copolymerization is carried out in a known manner in solution, in suspension or in the gas phase, continuously or batchwise, in one or more stages, at a temperature of $0°$ to $150°$ C., preferably $30°$ to $80°$ C. Olefins of the formula $R^a$—CH= CH—$R^b$ are polymerized or copolymerized. In this formula, $R^a$ and $R^b$ are identical or different and are a hydrogen atom or an alkyl radical having 1 to 14 C atoms. However, $R^a$ and $R^b$, together with the C atoms binding them, may also form a ring. Examples of such olefins are ethylene, propylene, 1-butene, 1-hexene, 4-methyl-1-pentene, 1-octene, norbornene or norbornadiene. In particular, propylene and ethylene are polymerized.

If required, hydrogen is added as a molecular weight regulator. The total pressure in the polymerization system is 0.5 to 100 bar. Polymerization in the industrially particularly interesting pressure range from 5 to 64 bar is preferred.

The metallocene is used here in a concentration, based on the transition metal, of $10^{-3}$ to $10^{-8}$, preferably $10^{-4}$ to $10^{-7}$, mol of transition metal per $dm^3$ of solvent or per $dm^3$ of reactor volume. The aluminoxane is used in a concentration of $10^{-5}$ to $10^{-1}$ mol, preferably $10^{-4}$ to $10^{-2}$ mol, per $dm^3$ of solvent or per $dm^3$ of reactor volume. In principle, however, higher concentrations are also possible.

If the polymerization is carried out as a suspension or solution polymerization, an inert solvent conventionally used for the Ziegler low pressure process is employed. For example, the reaction is carried out in an aliphatic or cycloaliphatic hydrocarbon; butane, pentane, hexane, heptane, isooctane, cyclohexane and methylcyclohexane may be mentioned as examples of these.

A gasoline or hydrogenated diesel oil fraction may furthermore be used. Toluene can also be used. Polymerization is preferably carried out in the liquid monomer.

If inert solvents are used, the monomers are metered in as a gas or liquid.

The polymerization can be carried out for any desired time, since the catalyst system to be used according to the invention shows only a slight time-dependent decrease in the polymerization activity.

In the process according to the invention, the metallocenes described produce polymers having a high molecular weight, high stereospecificity and good particle morphology in the industrially interesting temperature range between $30°$ and $80°$ C.

In particular, the zirconocenes according to the invention provide a molecular weight range which, in the prior art, was provided only by the hafnocenes. However, these have the disadvantage of only low polymerization activity and very high catalyst costs, and the polymers prepared therewith had a poor powder morphology.

The Examples which follow are intended to illustrate the invention in more detail.

VN = Viscosity number in $cm^3/g$ } Determined by gel permeation chromatography
$M_w$ = Weight average molecular weight in g/mol
$M_w/M_n$ = Molecular weight dispersity
m.p. = Melting point determined by DSC ($20°$ C./min heating/cooling rate)
II = Isotactic index (II = mm + ½ mr) determined by $^{13}$C-NMR spectroscopy
BD = Polymer bulk density in $g/dm^3$
MFI (230/5) = Melt flow index, measured according to DIN 53,735, in g/10 min Synthesis of the metallocenes used in the Examples:

Starting substances:

The preparation of the indenyls $H_2R^c$ and $H_2R^d$ used as starting compounds is carried out according to or analogously to:

J. Org. Chem., 49 (1984) 4226–4237, J. Chem. Soc., Perkin II,.1981, 403–408, J. Am. Chem. Soc., 106 (1984) 6702, J. Am. Chem. Soc., 65 (1943) 567, J. Med. Chem., 30 (1987) 1303–1308, Chem. Ber. 85 (1952) 78–85.

The preparation of the chelate ligands LiR$^c$—$(CR^8R^9)_m$—$R^7$—$(CR^8R^9)_n$—$R^d$Li is described in principle in:

Bull. Soc. Chim., 1967, 2954, J. Am. Chem. Soc., 112 (1990) 2030–2031, ibid. 110 (1988) 6255–6256, ibid. 109 (1987), 6544–6545, J. Organomet. chem., 322 (1987) 65–70, New. J. Chem. 14 (1990) 499–503.

(I) Synthesis of 2-Me-indene 110.45 9 (0.836 mol) of 2-indanone were dissolved in 500 cm³ of diethyl ether, and 290 cm³ of 3 N (0.87 mol) ethereal methylgrignard solution were added dropwise so that gentle refluxing occurred. After boiling for 2 hours with a gentle refluxing, the mixture was poured onto an ice/hydrochloric acid mixture and adjusted to pH 2-3 with ammonium chloride. The organic phase was separated off, washed with NaHCO₃ and sodium chloride solution and dried. 98 g of crude product (2-hydroxy-2-methylindane) were obtained, which was not further purified.

This product was dissolved in 500 cm³ of toluene and heated with 3 g of p-toluenesulfonic acid under a water separator until the elimination of water was complete, the mixture was evaporated down, the residue was taken up in dichloromethane, the solution was filtered over silica gel and the filtrate was distilled in vacuo (80° C./10 mbar). Yield: 28.49 g (0.22 mol-26%).

The synthesis of this compound is also described in: C. F. Koelsch, P. R. Johnson, J. Am. Chem. Soc., 65 (1943) 567–573

(II) Synthesis of (2-Me-Indene)₂SiMe₂

13 g (100 mol) of 2-Me-indene were dissolved in 400 cm³ of diethyl ether, and 62.5 cm³ of 1.6 N (100 mmol) of n-butyllithium/n-hexane solution were added dropwise in the course of 1 hour while cooling with ice, after which stirring was continued for 1 hour at ~35° C.

6.1 cm³ (50 mmol) of dimethyldichlorosilane in 50 cm³ of Et₂O were initially taken, and the lithio salt solution was added dropwise in the course of 5 hours at 0° C., stirring was carried out overnight at room temperature and the mixture was allowed to stand over the weekend.

The solid which had settled out was filtered off and the filtrate was evaporated to dryness. After extraction with small portions of n-hexane, filtration was carried out and the filtrate was evaporated down. 5.7 g (18.00 mmol) of white crystals were obtained. The mother liquor was evaporated down and then purified by column chromatography (n-hexane/H₂CCl₂ 9 : 1 parts by volume), 2.5 g (7.9 mmol-52%) of product being obtained (as an isomer mixture).

$r_F$ (SiO₂; n-hexane/H₂CCl₂ 9 : 1 parts by volume)=0.37

The ¹H-NMR spectrum shows the signals to be expected for an isomer mixture, in shift and integration ratio.

(III) Synthesis of (2-Me-Ind)₂CH₂CH₂ 3 g (2 =-indene were dissolved in 50 cm³ of THF, 14.4 cm³ of 1.6 N (23.04 mmol) n-butyllithium/ n-hexane solution were added dropwise and stirring was then carried out for 1 hour at 65° C. Thereafter, 1 ml (11.5 mmol) of 1,2-dibromoethane was added at −78° C., and the mixture was allowed to warm to room temperature and was stirred for 5 hours. It was evaporated down and then purified by column chromatography (SiO₂; n-hexane/H₂CCl₂ 9:1 parts by volume).

The product-containing fractions were combined and evaporated down, the residue was taken up in dry ether, the solution was dried over MgSO₄ and filtered and the solvent was stripped off.

Yield: 1.6 g (5.59 mmol–49%) of isomer mixture $r_F$ (SiO₂; n-hexane/H₂CCl₂ 9:1 parts by volume)=0.46

The ¹H-NMR spectrum meets the expectation for an isomer mixture in signal shift and integration.

(A) Synthesis of rac-dimethylsilyl(2-Me-1-indenyl)₂-zirconium dichloride 1 68 g (5.31 mmol) of the chelate ligand dimethylsilyl(2-methylindene)₂ were added to 50 cm³ of THF, and 6.63 cm³ of a 1.6 N (10.61 mmol) n-BuLi/n-hexane solution were added dropwise. The addition was carried out at ambient temperature in the course of 0.5 hour. The mixture was stirred for 2 hours at about 35° C., after which the solvent was stripped off in vacuo, the residue was stirred with n-pentane and the solid was filtered off and dried.

The dilithio salt thus obtained was added at −78° C. to a suspension of 1.24 g (5.32 mmol) of ZrCl in 50 cm³ of CH₂Cl₂ and the mixture was stirred for 3 hours at this temperature. After warming up to room temperature overnight, the mixture was evaporated down. The ¹H-NMR spectrum indicated a rac-meso mixture in addition to the presence of a little ZrCl₄(thf)₂. After stirring with n-pentane and drying, the solid, yellow residue was suspended in THF, filtered off and investigated by NMR spectroscopy. These three operations were repeated several times; finally 0.35 g (0.73 mmol-14%) of product was obtained, in which, according to ¹H-NMR, the rac form had been concentrated to more than 17 : 1.

The compound gave a correct elemental analysis and the following NMR signals (CDCl₃, 100 MHz): $\delta$ = 1.25 (s, 6H, Si-Me); 2.18 (s, 6H, 2-Me), 6.8 (s, 2H, 3-H-Ind); 6.92-7.75 (m, 8H, 4-7-H-Ind).

(B) Synthesis of rac-dimethylsilyl(2-Me-1-indenyl)₂-zirconiumdimethyl 1.3 cm³ of a 1.6 N (2.08 mmol) ethereal MeLi solution were added dropwise to 0.24 g (0.58 mmol) of rac-dimethylsilyl (2-Me-1-indenyl)₂zirconium dichloride in 40 cm³ of Et₂O at −50° C., and stirring was carried out for 2 hours at −10° C. After exchanging the solvent for n-pentane, stirring was continued for a further 1.5 hours at room temperature and the filtered residue was sublimed in vacuo. 0.19 g (0.44 mmol-81%) of sublimate with a correct elemental analysis was obtained.

(C) Reaction of rac-dimethylsilyl(2-Me-1-indenyl)₂-−zirconiumdimethyl with [Bu₃NH][B(C₆H₅)₄] 0.17 g (0.39 mmol) of rac-dimethylsilyl(2-Me-1-indenyl)₂-zirconiumdimethyl was added at 0° C. to 0.18 g (0.36 mmol) of [Bu₃NH][B(C₆H₅)₄] in 25 cm³ of toluene. The mixture was warmed up to ambient temperature while stirring for one hour. The deeply coloured mixture was then evaporated to dryness.

An aliquot part of the reaction mixture was used for the polymerization.

(D) Synthesis of rac-ethylene(2-Me-1-indenyl)₂zirconium dichloride 14.2 cm² of 2.5 N (35.4 mmol) n-BuLi/n-hexane solution were added dropwise to 5.07 g (17.7 mmol) of the ligand ethylene(2-methylindene)₂ in 200 cm³ of THF at room temperature in the course of 1 hour, and stirring was then carried out for 3 hours at about 50° C. A precipitate which was formed in the meantime goes into solution again. The solution was allowed to stand overnight.

6.68 g (17.7 mmol) of ZrCl₄(thf)₂ in 250 cm³ of THF were added dropwise, simultaneously with the above dilithio salt solution, to about 50 cm³ of THF at 50° C., and stirring was then carried out for 20 hours at this temperature. The toluene extract of the evaporation residue was evaporated down. After extraction of the residue with a small amount of THF, recrystallization was effected from toluene. 0.44 g (0.99 mmol-5.6%) of product was obtained, the rac form having been concentrated to more than 15 : 1.

The compound gave a correct elemental analysis and the following NMR signals (CDCl₃, 100 MHz): $\delta = 2.08$ (2s, 6H, 2-Me); 3.45–4.18 (m, 4H, —CH₂CH₂—), 6.65 (2H, 3-H-Ind); 7.05–7.85 (m, 8H, 4-7-H-Ind).

(E) Synthesis of rac-ethylene(2-Me-1-indenyl)₂zirconiumdimethyl 1.5 cm³ of a 1.6 N (2.4 mmol) ethereal MeLi solution were added to 0.31 g (0.68 mmol) of rac-ethylene(2-Me-1-indenyl)₂zirconium dichloride in 40 cm³ of Et₂O, and stirring was carried out for 2 hours at -40° C. After exchanging the solvent for n-pentane, stirring was carried out for 1.5 hours at ambient temperature and the mixture was filtered and the filtrate evaporated down. 0.22 g (0.54 mmol-80%) of sublimate with the correct elemental analysis was obtained.

(F) Reaction of rac-ethylene(2-Me-1-indenyl)₂zirconiumdimethyl with [Bu₃NH][B(p-tolyl)₄] 0.13 g (0.32 mmol) of rac-ethylene(2-methyl-1-indenyl)₂-zirconiumdimethyl was added to 0.16 g (0.28 mmol) of [Bu₃NH][B(p-tolyl)₄] in 20 cm³ of toluene and stirring was carried out for 1 hour at ambient temperature. The solvent was stripped off and drying was then carried out in vacuo.

An aliquot part of the reaction mixture was used for the polymerization.

EXAMPLE 1

A dry 24 dm³ reactor was flushed with nitrogen and filled with 12 dm³ of liquid propylene.

35 cm³ of a solution of methylaluminoxane in toluene (corresponding to 52 mmol of Al, mean degree of oligomerization n = 17) were then added and the batch was stirred at 30° C. for 15 minutes.

At the same time, 6.9 mg (0.015 mmol) of rac-ethylene(2-Me-1-indenyl)₂zirconium dichloride were dissolved in 13.5 cm³ of a solution of methylaluminoxane in toluene (20 mmol of Al) and preactivated by allowing the solution to stand for 15 minutes.

The solution was then introduced into the reactor and heated to 70° C. by supplying heat (10° C./min), and the polymerization system was kept at 70° C. for 1 hour by cooling. The polymerization was stopped by allowing the excess gaseous monomer to escape. 1.56 kg of propylene were obtained. The activity of the metalloceno was thus 226 kg of P.P per g of metallocene per h.

VN = 67 cm³/g; $M_w$ = 58,900 g/mol; $M_w/M_n$ = 2.0; II = 95.9%; BD = 350 g/dm³

EXAMPLE 2

Example 1 was repeated, except that 10.1 mg (0.023 mmol) of metallocene were used and polymerization was carried out at 50° C.

0.51 kg of polymer powder were obtained, corresponding to a metallocene activity of 50.5 kg of PP per g of metallocene per h.

VN = 100 cm³/g; $M_w$ = 108,500 g/mol; $M_w/M_n$ = 2.2; II = 96.4%; MFI (230/5) = 210 g/10 min.

EXAMPLE 3

Example 1 was repeated, except that 10.5 mg (0.023 mmol) of the metallocene were used and polymerization was carried out at 30° C. for 10 hours.

1.05 kg of polymer powder were obtained, corresponding to a metallocene activity of 10.0 kg of PP per g of metallocene per h.

VN = 124 cm³/g; $M_2$ = 157,000 g/mol; $M_w/M_n$32 2.2; II = 96.3%; MFI (230/5) = 104 g/10 min.

Comparative Examples A–C

Polymerization was carried out analogously to Examples 1 to 3, using the metallocene rac-ethylenebisindenylzirconium dichloride. The viscosity numbers and molecular weights of the resulting polymer products were:

| Comparative Example | Polym. temp. [°C.] | VN [cm³/g] | $M_w$ [g/mol] |
|---|---|---|---|
| A | 70 | 30 | 19,900 |
| B | 50 | 46 | 38,500 |
| C | 30 | 60 | 48,700 |

These Comparative Examples show the effect of the substituent in the 2-position on the indenyl ligand in respect of increasing the molecular weight.

EXAMPLE 4

The procedure in Example 1 was followed, except that 4.0 mg (0.008 mmol) of rac-dimethylsilyl(2-methyl-1-indenyl)₂-zirconium dichloride were used. The metallocene activity was 293 kg of PP per g of metallocene per h.

VN = 171 cm³/g; $M_w$ = 197,000 g/mol; $M_w/M_n$ = 2.5; II = 96.0%; MFI (230/5) = 43.2 g/10 min; BD = 460 g/dm³; m.p. = 145° C.

EXAMPLE 5

The procedure in Example 1 was followed, except that 6.0 mg (0.013 mmol) of rac-dimethylsilyl(2-methyl-1-indenyl)₂zirconium dichloride were used.

The polymerization temperature was 60° C. and the polymerization time was 1 hour. The metallocene activity was 178 kg of P.P per g of metallocene per h.

VN = 217 cm³/g; $M_w$ = 297,000 g/mol; $M_w/M_2$ = 2.3; II = 96.4%; MFI (230/5) = 12.9 g/10 min; m.p. = 148° C.

EXAMPLE 6

The procedure in Example 1 was followed, except that 2.4 mg (0.0052 mmol) of rac-dimethylsilyl(2-methyl-1-indenyl)₂zirconium dichloride were used. The polymerization temperature was 50° C. and the polymerization time was 3 hours. The metallocene activity was 89 kg of PP per g of metallocene per h.

VN=259 cm$^3$/g; M$_w$=342,500 g/mol; M$_w$/M$_n$=2.1; II = 96.8%; MFI (230/5)=8.1 g/10 min; m.p.=150° C.

EXAMPLE 7

The procedure in

EXAMPLE 1 was followed, except that 9.9 mg (0.021 mmol) of rac-dimethylsilyl(2-methyl-1-indenyl)$_2$zirconium dichloride were used.

The polymerization temperature was 30° C., and the polymerization time was 2 hours. The metallocene activity was 26.5 kg of PP per g of metallocene per h.

VN=340 cm$^3$/g; M$_w$=457,000 g/mol; M$_w$/M$_n$=2.4; II= 96.0%; MFI (230/5)=2.5 g/10 min; m.p.=153° C.

EXAMPLE 8

A dry 24 dm$^3$ reactor was flushed with nitrogen and filled with 6 dm$^3$ of a gasoline cut from which aromatics had been removed and which had a boiling range of 100°-120° C. and 6 dm$^3$ of liquid propylene. 35 cm$^3$ of a solution of methylaluminoxane in toluene (corresponding to 52 mmol of Al, mean degree of oligomerization n=17) were then added and the batch was stirred at 30° C. for 30 minutes.

At the same time, 14.7 mg (0.031 mmol) of rac-dimethylsilyl(2-methyl-1-indenyl)$_2$zirconium dichloride were dissolved in 13.5 cm$^3$ of a solution of methylaluminoxane in toluene (20 mmol of Al) and preactivated by allowing the solution to stand for 30 minutes.

The solution was then introduced into the reactor and the polymerization system was kept at 50° C. for 1 hour by cooling. The polymerization was stopped by adding 50 cm$^3$ of isopropanol. The metallocene activity was 159.2 kg of PP per g of metallocene per h.

VN=188 cm$^3$/g; M$_w$=240,000 g/mol; M$_w$/M$_n$32 2.1; II= 96.0%; MFI (230/5)=28.6 g/10 min; m.p.=149° C.

EXAMPLE 9

Example 8 was repeated, except that 15.2 mg (0.032 mmol) of the metallocene were used, the polymerization time was 2 hours and the polymerization temperature was 30° C. The metallocene activity was 24.1 kg of PP per g of metallocene per h.

VN=309 cm$^3$/g; M$_w$=409,000 2.3; II= 97.0%; MFI (230/5)=3.5 g/10 min; m.p.=153° C.

Comparative Examples D-F

Polymerization was carried out analogously to Examples 4, 6 and 7 using the metallocene dimethylsilyl-bisindenylzirconium dichloride. The viscosity numbers and molecular weights of the resulting polymer products were:

| Comparative Example | Polym. temp. [°C.] | VN [cm$^3$/g] | M$_w$ [g/mol] |
|---|---|---|---|
| D | 70 | 47 | 37,500 |
| E | 50 | 60 | 56,000 |
| F | 30 | 77 | 76,900 |

These Examples show the effect of the substituent in the 2-position on the indenyl ligand in respect of increasing the molecular weight.

EXAMPLE 10

A dry 16 dm$^3$ reactor was flushed with nitrogen. 40 dm$^3$ (corresponding to 2.5 bar) of hydrogen and finally 10 dm$^3$ of liquid propylene and 29.2 cm$^3$ of a solution of methylaluminoxane in toluene (corresponding to 40 mmol of Al, mean degree of oligomerization 17) were then metered in, and stirring was carried out at 30° C. for 10 minutes.

At the same time, 2.7 mg (0.006 mmol) of rac-dimethylsilyl(2-Me-1-indenyl)$_2$-zirconium dichloride were dissolved in 11.2 cm$^3$ of a solution of methylaluminoxane in toluene (20 mmol) and introduced into the reactor after 10 minutes. Polymerization was carried out for 3 hours after heating to 50° C. The polymerization was stopped by adding CO$_2$ gas, and excess gaseous monomer was allowed to escape. The metallocene activity was 102.9 kg of PP per g of metallocene per h.

VN=25 cm$^3$/g; M$_w$=8,500 g/mol; M$_w$/M$_n$32 2.4; no olefinic chain ends according to $^{13}$C-NMR; II=97.8%; m.p.=149° C.

EXAMPLE 11

Example 10 was repeated, except that 5.0 mg (0.011 mmol) of rac-dimethylsilyl(2-Me-1-indenyl)$_2$zirconiumdimethyl and 16 dm$^3$ (corresponding to 1 bar) of hydrogen were used.

Polymerization was carried out at 60° C. for 50 minutes. The metallocene activity was 204 kg of PP per g of metallocene per h.

VN=47 cm$^3$/g; M$_w$=41,100 g/mol; M$_w$/M$_n$=2.2; no olefinic chain ends according to $^{13}$C-NMR; II=96.9%; m.p.=148° C.

EXAMPLE 12

Example 11 was repeated with 4.2 mg (0.01 mmol) of racdimethylsilyl(2-Me-1-indenyl)$_2$zirconiumdimethyl. However the polymerization temperature was 70° C. and the polymerization time was 1 hour. The metallocene activity was 354 kg of PP per g of metallocene per h.

VN=38 cm$^3$/g; M$_w$=34,900 g/mol; M$_w$/M$_n$32 2.1; no olefinic chain ends according to $^{13}$C-NMR; II=96.7%; m.p.=146° C.

Examples 10 to 12 show the good regulatability of the molecular weight with hydrogen when the polymerization process according to the invention was used.

EXAMPLE 13

Example 11 was repeated, except that no hydrogen was used. The metallocene activity was 182.4 kg of PP per g of metallocene per h.

VN=210 cm$^3$/g; M$_w$=288,000 g/mol; M$_w$/M$_n$=2.2; II= 96.2%

EXAMPLE 14

Example 11 was repeated, except that 4.2 mg (0.01 mmol) of rac-ethylene(2-Me-1-indenyl)$_2$zirconiumdimethyl were used. The metallocene activity was 144.3 kg of PP per g of metallocene per h.

VN=16 cm$^3$/g; M$_w$=8,900 g/mol; M$_w$/M$_n$=2.0; II=96.0%.

EXAMPLE 15

A dry 24 dm$^3$ reactor was flushed with nitrogen and filled with 12 dm$^3$ of liquid propylene and with 4.0 cm$^3$ of a solution of methylaluminoxane in toluene (corresponding to 6 mmol of Al, mean degree of oligomerization 17), and stirring was carried out at 30° C. for 15 minutes. 2.5 cm³ of the reaction mixture of rac-dimethylsilyl(2-Me-1-indenyl)₂zirconiumdimethyl and [Bu₃NH][B(C₆H₅)₄], which mixture was described in Section (C) of the metallocene synthesis and corresponds to 17 mg (0.04 mmol) of metallocene, in toluene, were metered into the vessel. Polymerization was carried out at 50° C. for 1 hour. The metallocene activity was 61.4 kg of PP per g of metallocene per h.

VN=238 cm³/g; $M_w$=328,500 g/mol; $M_w/M_n$=2.2; II= 96.0%.

EXAMPLE 16

Example 15 was repeated, except that 2.5 cm³ of the reaction mixture of rac-ethylene(2-methyl-1-indenyl)₂-zirconiumdimethyl and [Bu₃NH][B(p-tolyl)₄], which mixture was described in Section F) of the metallocene synthesis and corresponds to 16.3 mg (0.04 mmol) of metallocene, in toluene, were used. The metallocene activity was 42.9 kg of PP per g of metallocene per h.

VN=105 cm³/g; $M_w$=110,500 g/mol; $M_w/M_n$=2.3; II = 96.0%.

EXAMPLE 17

Example 15 was repeated, except that a solution of trimethylaluminum in toluene (8 mmol of Al) was used instead of the methylaluminoxane solution. The metallocene activity was 55.3 kg of PP per g of metallocene per h.

VN=264 cm³/g; $M_w$=367,000 g/mol; $M_w/M_n$=2.3; II = 96.2%.

EXAMPLE 18

Example 17 was repeated, except that no trimethylaluminum was used in the polymerization.

The propylene used was purified with triethylaluminum (1 mmol of AlEt₃/dm³ of propylene) before being added to the polymerization system, and the reaction products and AlEt₃ were separated off by distillation. The metallocene activity was 56.9 kg of PP per g of metallocene per h.

VN=278 cm³/g; $M_w$=362,000 g/mol; $M_w/M_n$=2.3; II=96.3%

EXAMPLE 19

A dry 16 dm³ reactor was flushed with nitrogen and filled at 20° C. with 10 dm³ of a gasoline cut from which aromatics had been removed and which had a boiling range of 100°-120° C.

The gas space of the vessel was then flushed nitrogen-free by forcing in 2 bar of ethylene and letting down the pressure, these operations being carried out 5 times.

Thereafter, 30 cm³ of a solution of methylaluminoxane in toluene (corresponding to 45 mmol of Al, molecular weight according to cryoscopic determination 750 g/mol) were added.

The reactor content was heated to 60° C. in the course of 15 minutes while stirring, and the total pressure was adjusted to 5 bar at a stirring speed of 250 rpm by adding ethylene.

At the same time, 2.3 mg (0.005 mmol) of rac-ethylene(2-methyl-1-indenyl)₂zirconium dichloride were dissolved in 20 cm³ of a solution of methylaluminoxane in toluene and preactivated by allowing the solution to stand for 15 minutes. The solution was then introduced into the reactor, and the polymerization system was brought to a temperature of 70° C. and kept at this temperature for 1 hour by appropriate cooling. The total pressure was kept at 5 bar during this time by appropriate supply of ethylene.

420 g of polyethylene were obtained, corresponding to a metallocene activity of 182.6 kg of PE per g of metallocene per h. The viscosity number was 300 cm³/g.

Comparative Example G

Polymerization was carried out with the metallocene rac-ethylene(1-indenyl)₂-zirconium dichloride under conditions analogous to example 19. A polyethylene having a viscosity number of 210 cm³/g was obtained.

The Comparative Example demonstrates the effect of substitution in the 2-position of the indenyl ligand in respect of increasing the molecular weight.

EXAMPLE 20

Example 7 was repeated, except that the aluminoxane used was isobutylmethylaluminoxane in the same Al concentration and amount. The metallocene activity was 27.4 kg of PP per g of metallocene per h, $M_w$ was 477,500 g/mol, the VN was 340 cm³/g an was 2.2. Isobutylmethylaluminoxane was obtained by reacting a mixture of isobutyl-AlMe₂ and AlMe₃ with water in heptane and contained 9 mol % of isobutyl units and 91 mol % of methyl units.

EXAMPLE 21

Example 7 was repeated, except that the aluminoxane used was hydridomethylaluminoxane (prepared from Me₂AlH and water in toluene) in the same Al concentration and amount. The activity was 22.9 kg of PP per g of metallocene per h, $M_w$ was 469,500 g/mol, the VN was 339 cm³/g and $M_w/M_n$ was 2.0.

EXAMPLE 22

A dry 150 dm³ reactor was flushed with nitrogen and filled, at 20° C., with 80 dm³ of a gasoline cut from which aromatics had been removed and which had a boiling range of 100°-120° C. Thereafter, the gas space was flushed nitrogen-free by forcing in 2 bar of propylene and letting down the pressure, these operations being carried out 5 times.

After the addition of 50 l of liquid propylene, 64 cm³ of a solution of methylaluminoxane in toluene (corresponding to 100 mmol of Al, molecular weight according to cryoscopic determination 990 g/mol) were added and the reactor content was heated to 30° C.

By metering in hydrogen, a hydrogen content in the gas space of the reactor of 0.3% was established and was subsequently maintained during the entire polymerization time by further metering (on-line monitoring by gas chromatography).

24.3 mg of rac-dimethylsilyl(2-methyl-1-indenyl)₂zirconium dichloride (0.05 mmol) were dissolved in 32 ml of a solution of methylaluminoxane in toluene (corresponding to 50 mmol of Al), and the solution was introduced into the reactor after 15 minutes.

The reactor was kept at the polymerization temperature of 30° C. for 24 hours by cooling, and the polymerization was then stopped by adding 2 bar of CO₂ gas and the polymer formed was isolated from the suspension medium over a pressure filter. The product was dried for 24 hours at 80°/200 mbar. 10.5 kg of polymer powder, corresponding to a metallocene activity of 18.0 kg of PP per g of metallocene per h, were obtained.

VN=256 cm³/g; $M_w$=340,500 g/mol; $M_w/M_n$=2.2;
II = 97.3%; MFI (230/5)=5.5 g/10 min; m.p.=156° C.

EXAMPLE 23

Example 22 was repeated, except that 0.6% of H₂ was established in the gas space, 20.6 mg (0.043 mmol) of the metallocene were used and the polymerization temperature was 50° C.

19.2 kg of polymer powder, corresponding to a metallocene activity of 38.8 kg of PP per g of metallocene per h, were obtained.

VN=149 cm³/g; $M_w$=187,500 g/mol; $M_w/M_n$=2.3;
II =97.0%; MFI (230/5)=82 g/10 min; m.p.=150° C.

EXAMPLE 24

Example 23 was repeated, except that no hydrogen was used, the weight of metallocene was 31.0 mg (0.065 mmol) and the polymerization time was 4 hours.

8.0 kg of polymer powder, corresponding to a metallocene activity of 64.5 kg of PP per g of metallocene per h, were obtained.

VN=175 cm³/g; $M_w$=229,000 g/mol; $M_w/M_n$=2.2;
II=97.1%; MFI (230/5)=35 g/10 min; m.p.=150° C.

EXAMPLE 25

Example 1 was repeated, except that 4.1 mg (0.008 mmol) of the metallocene rac-phenyl(methyl)silyl(2-methyl-1-indenyl)₂ZrCl₂ were used.

1.10 kg of polypropylene were obtained, corresponding to an activity of the metallocene of 269 kg of PP per g of metallocene per h.

VN=202 cm³/g; $M_w$=230,000 g/mol; $M_w/M_n$=2.3;
II=97%; MFI (230/5)=36 g/10 min; m.p.=147° C.

EXAMPLE 26

Example 25 was repeated with 11.0 mg (0.02 mmol) of the metallocene, but the polymerization temperature was 50° C.

1.05 kg of polypropylene were obtained. The activity of the metallocene was 95.5 kg of PP per g of metallocene per h.

VN 347 cm³/g; 444,000 g/mol; 2.5; MFI (230/5)=5.2 g/10 min; m.p.=149° C.

EXAMPLE 27

Example 25 was repeated with 22.5 mg (0.04 mmol) of the metallocene, but the polymerization temperature was 30° C.

0.57 kg of polypropylene was obtained and the activity of the metallocene was thus 25.3 kg of PP per g of metallocene per h.

VN=494 cm³/g; $M_w$=666,000 g/mol; $M_w/M_n$=2.5;
MFI (230/5)=1.3 g/10 min; m.p.=152° C.

EXAMPLE 28

Example 1 was repeated, except that 5.2 mg (0.009 mmol) of the metallocene rac-diphenylsilyl(2-methyl-1-indenyl)₂ZrCl₂ were used.

1.14 kg of polypropylene were obtained. The metallocene activity was thus 219 kg of PP per g of metallocene per h.

VN=298 cm³/g; $M_w$=367,000 g/mol; 2.2; MFI (230/5)=7.1 g/10 min

EXAMPLE 29

Example 28 was repeated with 12.6 mg (0.02 mmol) of the metallocene but the polymerization temperature was 40° C.

0.44 kg of polypropylene was obtained and the metallocene activity was thus 34.9 kg of PP per g of metallocene per h.

g/mol; 2.4; MFI
VN=646 cm³/g; $M_x$=845,000 g/mol; $M_w/M_n$=2.4;
MFI (230/5)=0.1 g/10 min; m.p.=155° C.

EXAMPLE 30

Example 1 was repeated, except that 17.4 mg (0.038 mmol) of the metallocene rac-methylethylene(2-methyl-1-indenyl)₂ZrCl₂ were used.

2.89 kg of polypropylene were obtained. The metallocene activity was thus 165.9 kg of PP per g of metallocene per h.

VN=138 cm³/g; $M_w$=129,000 g/mol; $M_w/M_n$=2.2;
m.p.=150° C

EXAMPLE 31

Example 30 was repeated with 15.6 mg (0.034 mmol) of the metallocene but the polymerization temperature was 50° C. and the polymerization time was 2 hours.

2.86 kg of polypropylene were obtained. The metallocene activity was thus 91.7 kg of PP per g of metallocene per h.

VN=244 cm³/g; $M_w$=243,500 g/mol; $M_w/M_n$=2.1;
m.p.=155° C.

EXAMPLE 32

Example 30 was repeated with 50.8 mg (0.110 mmol) of the metallocene but the polymerization temperature was 30° C.

1.78 kg of polypropylene were obtained and the metallocene activity was thus 17.5 kg of PP per g of metallocene per h.

VN=409 cm³/g; $M_w$=402,000 g/mol; $M_w/M_n$2.2;
MFI (230/5)=3.5 g/10 min; m.p.=160° C.

EXAMPLE 33

Example 1 was repeated, except that 9.6 mg (0.02 mmol) of the metallocene rac-dimethylsilyl(2-methyl-1-indenyl)₂zirconium dichloride were used.

1.68 kg of polypropylene, corresponding to a metallocene activity of 175.0 kg of PP per g of metallocene per h were obtained.

VN=143 cm³/g; $M_w$=132,000 g/mol; $M_w/M_n$=2.3;
m.p.=140° C.

EXAMPLE 34

Example 33 was repeated, except that 10.4 mg (0.021 mmol) of the metallocene were used and the polymerization temperature was 50° C.

1.00 kg of polypropylene, corresponding to a metallocene activity of 96.2 kg of PP per g of metallocene per h, were obtained.

VN=303 cm³/g; $M_w$=449,500 g/mol; $M_w/M_n$=2.2;
m.p.=145° C.

EXAMPLE 35

Example 33 was repeated with 24.5 mg (0.049 mmol) of the metallocene at a polymerization temperature of 30° C. 0.49 kg of polypropylene, corresponding to a metallocene activty of 19.6 kg of PP per g of metallocene per h, was obtained.

VN=442 cm³/g; $M_w$=564,000 g/mol; $M_w/M_n$=2.2;
m.p.=150° C.

Example 36

A dry 24 dm³ reactor was flushed with nitrogen and filled with 2.4 dm³ (S.T.P.) of hydrogen and 12 dm³ of liquid propylene.

35 cm³ of a solution of methylaluminoxane in toluene (corresponding to 52 mmol of Al, mean degree of oligomerization p=17) were then added.

At the same time, 8.5 mg (0.02 mmol) of rac-dimethylsilyl)2-methyl-1-indenyl)₂zirconium dichloride were dissolved in 13.5 cm³ of a solution of methylaluminoxane in toluene (20 mmol of Al) and preactivated by allowing the solution to stand for 5 minutes.

The solution was then introduced into the reactor. Polymerization was carried out for 1 hour at 55° C. with continuous addition of 50 g of ethylene.

The metallocene activity was 134 kg of $C_2/C_3$-copolymer per g of metallocene per h.

The ethylene content of the copolymer was 4.3%.
VN=289 cm³/g; $M_w$=402,000 g/mol; $M_w/M_n$ 2.0; MFI (230/5)=7.0 g/10 min.

The ethylene was substantially incorporated as isolated units (¹³C-NMR, mean block length $C_2$ < 1.2).

Example 37

A dry 150 dm³ reactor was prepared as described in Example 22 and charged with propylene and catalyst.

The polymerization was carried out in a first stage at 50° C. for 10 hours.

In a second stage, 1 kg of ethylene was first rapidly added and a further 2 kg of ethylene were metered in continuously in the course of 4 hours.

21.5 kg of block copolymer powder were obtained.
VN=326 cm³/g; $M_w$=407,000 g/mol; $M_w/M_n$ 3.1; MFI (230/5)=4.9 g/10 min.

The block copolymer contained 12.5% of ethylene.

Fractionation gave a content of 24% of ethylene/propylene rubber in the copolymer. The mechanical data of the copolymer were:

Ball indentation hardness (DIN 53,456, pressed sheets, heated at 140° C. for 3 h, 132 N) 60 Nmm², notched impact strength ($a_{Kv}$, injection molded specimens according to DIN 53,453) 23° C.: no fracture, 0° C.: 39.5 mJmm⁻², −40° C.: 20.1 mJmm⁻².

The product is distinguished by an exceptional hardness/impact strength relationship and can be used for structural components, for example in automotive construction (e.g. bumpers), where high rigidity coupled with high impact strength, in particular at low temperatures, is required.

Abbreviations: Me=Methyl, Et=Ethyl, Bu=Butyl, Ph=Phenyl, THF=Tetrahydrofuran, PE=Polyethylene, PP=Polypropylene.

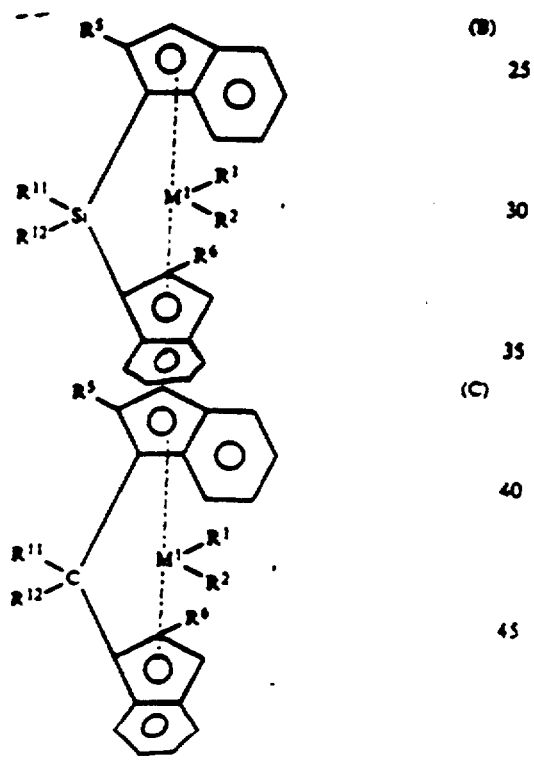

What is claimed is:

1. A process for the preparation of an essentially isotactic olefin polymer by polymerization or copolymerization of an olefin of the formula $R^a$—CH=CH—$R^b$, wherein $R^a$ and $R^b$ are identical or different and are a hydrogen atom or a hydrocarbon radical having 1 to 14 C. atoms, or $R^a$ and $R^b$, together with the atoms binding them, may form a ring, at a temperature of −60° to 200° C., at a pressure of 0.5 to 100 bar, in solution, in suspension or in the gas phase, in the presence of a catalyst which is composed of a metallocene as the transition metal compound and an aluminoxane of the formula (II)

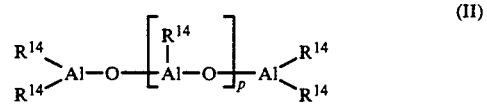

for the linear type or of the formula (III)

for the cyclic type, wherein, in the formulae (II) and (III), the radicals $R^{14}$ may be identical or different and are a $C_1$–$C_6$-alkyl group, a $C_6$–$C_{18}$-aryl group or hydrogen, and p is an integer of from 2 to 50, wherein the metallocene is a compound of the formula I

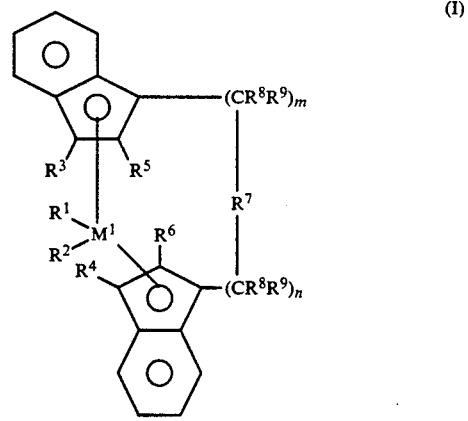

wherein
$M^1$ is a metal of group IVb, Vb or VIb of the Periodic Table,
$R^1$ and $R^2$ are identical or different and are a hydrogen atom, a $C_1$–$C_{10}$-alkyl group, a $C_1$–$C_{10}$-alkoxy group, a $C_6$–$C_{10}$aryl group, a $C_6$–$C_{10}$-aryloxy group, a $C_2$–$C_{10}$-alkenyl group, a $C_7$–$C_{40}$-arylalky group, a $C_7$–$C_{40}$-alkylaryl group, a $C_8$–$C_{40}$-arylalkenyl group or a halogen atom,
$R^3$ and $R^4$ are identical or different and are a hydrogen atom, a halogen atom, a $C_1$–$C_{10}$-alkyl group which is optionally halogenated, a $C_6$–$C_{10}$-aryl group, an —$NR_2^{10}$, —$SR^{10}$, —$OSiR_3^{10}$, —$SiR_3^{10}$ or —$PR_2^{10}$ radical, wherein $R^{10}$ is a halogen atom, a $C_1$–$C_{10}$-alkyl group or a $C_6$–$C_{10}$-aryl group,
$R^5$ and $R^6$ are identical or different and have the meaning stated for $R^3$ and $R^4$, with the proviso that $R^5$ and $R^6$ are not hydrogen,
$R^7$ is

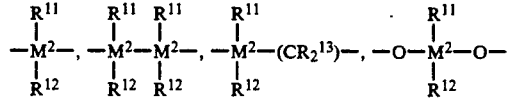

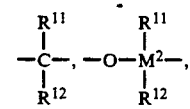

-continued $$=BR^{11}, =AlR^{11}, -Ge-, -Sn-, -O-, -S-, =SO,$$
$$=SO_2, =NR^{11}, =CO, =PR^{11} \text{ or } =P(O)R^{11},$$

wherein $R^{11}$, and $R^{12}$ and $R^{13}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ or $R^{11}$ and $R^{13}$, together with the atoms binding them, each form a ring, $M^2$ is silicon, germanium or tin, $R^8$ and $R^9$ are identical or different and have the meaning stated for $R^{11}$ and m and n are identical or different and are zero, 1 or 2, m plus n being zero, 1 or 2.

2. The process claimed in claim 1, wherein, in the formula I, $M^1$ is Zr or Hf, $R^1$ and $R^2$ are identical or different and are methyl or chlorine, $R^3$ and $R^4$ are hydrogen, $R^5$ and $R^6$ are identical or different and are methyl, ethyl or trifluoromethyl, $R^7$ is a radical

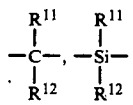

and n plus m is zero or 1.

3. A process for the preparation of an olefin polymer, wherein the olefin is polymerized in the presence of a catalyst comprising a compound of formula I as claimed in claim 1.

4. The process as claimed in claim 3, wherein said catalyst comprises said compound of formula I and an aluminoxane.

5. The process as claimed in claim 3, wherein the olefin to be polymerized has the formula $R^a$—CH=CH—$R^b$, wherein $R^a$ and $R^b$ are identical or different and are a hydrogen atom or a hydrocarbon radical having 1 to 14 C atoms, or $R^a$ and $R^b$, together with the atoms binding them, can form a ring.

6. The process as claimed in claim 5, wherein the olefin is polymerized at temperature of $-60°$ to $200°$ C., at a pressure of 0.5 to 100 bar, in solution, in suspension or in the gas phase.

7. The process as claimed in claim 3, wherein, in said formula I, $M^1$ is Zr or Hf, $R^1$ and $R^2$ are identical or different and are methyl or chlorine, $R^3$ and $R^4$ are hydrogen, $R^5$ and $R^6$ are identical or different and are methyl, ethyl, or trifluoromethyl, $R^7$ is a radical

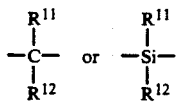

and n plus m is zero or 1.

8. The process as claimed in claim 3, wherein, in said formula I, $R^{11}$, $R^{12}$ and $R^{13}$ are identical or different and are a hydrogen atom, a halogen atom, a $C_1$-$C_4$-alkyl group, a $CF_3$ group, a $C_6$-$C_8$-aryl group, a pentafluorophenyl group, a $C_1$-$C_4$-alkoxy group, a $C_2$-$C_4$-alkenyl group, a $C_7$-$C_{10}$-arylalkyl group, a $C_8$-$C_{12}$-arylalkenyl group or a $C_1$-$C_{12}$-alkylaryl group, or $R^{11}$ and $R^{12}$ or $R^{11}$ and $R^{13}$, in each case together with the atoms connecting then, form a ring.

9. The process as claimed in claim 8, wherein $R^8$ and $R^9$ are identical or different and have the meaning stated for $R^{11}$.

10. The process as claimed in claim 1, wherein $R^{11}$, $R^{12}$ and $R^{13}$ are identical or different and are a hydrogen atom, a halogen atom, a $C_1$-$C_4$ alkyl group, a $CF_3$ group, a $C_6$-$C_8$-aryl group, a pentafluorophenyl group, a $C_1$-$C_4$alkoxy group, a $C_2$'$C_4$-alkenyl group, a $C_7$-$C_{10}$-arylalkyl group, a $C_8$-$C_{12}$-arylalkenyl group or a $C_7$-$C_{12}$-alkylaryl group, or $R^{11}$ and $R^{12}$ or $R^{11}$ and $R^{13}$, in each case together with the atoms connecting them, form a ring.

11. The process as claimed in claim 1, wherein $R^7$ is $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

12. The process as claimed in claim 1, wherein m and n are identical or different and are zero or 1.

13. The process for the preparation of an olefin polymer by polymerization or copolymerization of an olefin of the formula $R^1$—CH=CH—$R^b$, wherein $R^a$ and $R^b$ are identical or different and are a hydrogen atom or a hydrocarbon radical having 1 to 14 C. atoms, or $R^a$ and $R^b$, together with the atoms binding them, may form a ring, at a temperature of $-60°$ to $200°$ C., at a pressure of 0.5 to 100 bar, in solution, in suspension or in the gas phase, in the presence of a catalyst which is composed of a metallocene as the transition metal compound and an aluminoxane of the formula (II)

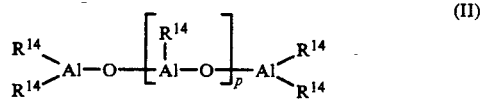

for the linear type or of the formula (III)

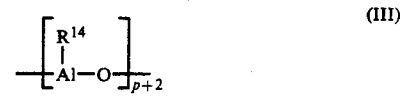

for the cyclic type,
wherein, in the formulae (II) and (III), the radicals $R^{14}$ may be identical or different and are a $C_1$-$C_6$-alkyl group, a $C_6$-$C_{18}$-aryl group or hydrogen, and p is an integer of from 2 to 50, wherein the metallocene is a compound selected from the group consisting of rac-dimethylsilyl(2-methyl-1-indenyl)$_2$zirconium dichloride, racethylene (2-methyl-1-idenyl)$_2$zirconium dichloride, rac-dimethylsilyl (2-methyl-1-indenyl)$_2$zirconium-dimethyl, rac-ethylene(2-methyl-1-idenyl)2zirconium-dimethyl, rac-phenyl(methyl-1-indenyl)$_2$zirconium dichloride, rac-diphenyl-silyl(2-methyl-1-indenyl) $_2$zirconium dichloride, rac-methylethylene(2-methyl-1-indenyl)$_2$zirconium dichloride and rac-dimethylsilyl(2-ethyl-1-indenyl)$_2$zirconium dichloride.

* * * * *

UNITED STATES PATENT AND TRADEMARK OFFICE
CERTIFICATE OF CORRECTION

PATENT NO.  : 5,243,001
DATED       : September 7, 1993
INVENTOR(S) : Winter et al It is certified that error appears in the above-indentified patent and that said Letters Patent is hereby corrected as shown below:

In Column 22, lines 59-60, the phrase "rac-phenyl(methyl-1-indenyl)$_2$zirconium dichloride" should read --rac-phenyl(methyl)silyl(2-methyl-1-indenyl)$_2$zirconium dichloride--.

Signed and Sealed this

Twenty-third Day of May, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,243,001  
DATED : September 7, 1993  
INVENTOR(S) : Winter et al

Page 1 of 2

It is certified that error appears in the above-indentified patent and that said Letters Patent is hereby corrected as shown below:

Column 5, lines 25-45, "Formula (B) and Formula (C)" should read as shown on the attached page Signed and Sealed this Thirtieth Day of July, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,243,001
DATED : September 7, 1993
INVENTOR(S) : Winter et al

Page 2 of 2

It is certified that error appears in the above-indentified patent and that said Letters Patent is hereby corrected as shown below: